E. Andrews,
Grinding Metal.
Nº 16,223. Patented Dec. 16, 1856.
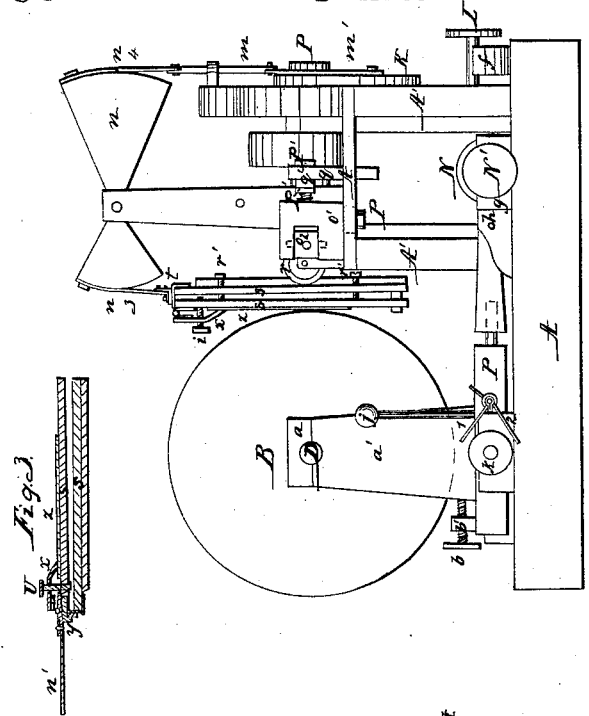
Fig. 2.
Fig. 3.
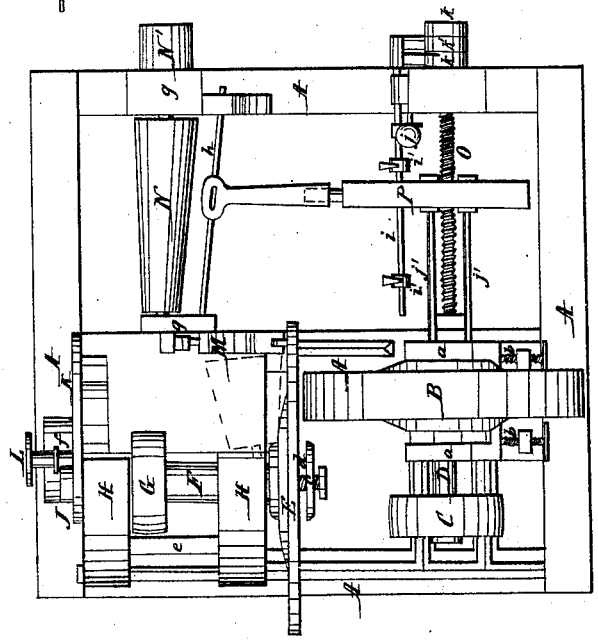
Fig. 1.

UNITED STATES PATENT OFFICE.

EMANUEL ANDREWS, OF ELMIRA, NEW YORK.

IMPROVED MACHINE FOR GRINDING SAWS.

Specification forming part of Letters Patent No. 16,223, dated December 16, 1856.

*To all whom it may concern:*

Be it known that I, EMANUEL ANDREWS, of Elmira, Chemung county, New York, have invented a new and Improved Machine for Grinding Saws and other Articles; and I do hereby declare that the following is a full and exact description thereof, reference being had to the accompanying drawings, and to to the letters and figures of reference marked thereon.

The nature of my invention consists in grinding circular saws on a taper for the purpose of giving strength to the saws and decreasing the resistance on the edge of same, and hand-saws thick at the handle and tapering to the point and thinner on the back; also, mill-saws thick on the edge and thin on the back, and cross-cut saws tapering from the center and thin on the back, or making any of them flat or of any even thickness, as may be desired.

Figure 1 is a plan view with face-plate and arrangement for grinding circular saws, with conical roller used instead of face-plate, as shown in red lines. Fig. 2 is an elevation showing arrangement for grinding short and long saws. Fig. 3 is a view showing the adjustable face-plate for grinding short or long saws.

In the construction of my machine, in Fig. 1, A is the frame; B, the stone; C, the pulley for driving the stone; D, the shaft; $a\ a$, the bearings of the shaft; $b\ b$, the screws for changing the cutting-surface of the stone; E, the face-plate; $c$, the collar; $d$, the screw for fastening the saw to the face-plate; F, the saw-mandrel; $e$, the brace; G, the pulley; H, the uprights of the sliding frame; I, the gear-wheel on the end of the mandrel; K, the cog-wheel for giving motion to the reciprocating adjustable face-plate for grinding straight saws and other articles; L, the screw for adjusting the sliding frame moving the face-plate up to the stone; $f$, the bearing of the adjustable screw; M, the adjustable yielding guide, with friction-roller bearing against the face-plate; N, the conical belt-pulley; N$'$, the pulley on the end of same shaft; $g\ g$, the shaft-bearings; $h$, the sliding rod parallel with the face of said pulley; $i$, the shifting-rod changing the bolts; $i'$ movable rings with thumb-screws for regulating the distance I wish the stone to traverse; J$'$, the regulating-lever; O, the adjusting-screw for causing the stone to traverse, having its worm in the arm through which it passes. J J are rods connecting the sliding carriage on which the stone is hung with the sliding arm; P, the arm; $k\ k$, stationary pulleys; K$'$, loose pulley on the end of screw O.

In Fig. 2, B is the stone; D, the shaft; $a$, the bearing; $a'$, the upright on which the stone is hung; $b$, one of the screws for altering the stone and changing its bearing or cutting surface on the same; $b'$, the screw-bearing; $k$, the stationary pulley on the screw O; J$'$, the regulating-lever; I, the rod for shifting the belts; 1 and 2, the belt-holders; P, the sliding arm; $h$, the end of the rod on which the arm slides; N$'$, the pulley on the end of the shaft with the conical roller; $g$, the shaft-bearing; A$'$, the sliding frame; K, the cog-wheel operating the adjustable face-plate for grinding short or long saws; $m$, the connecting crank-rod attached to lever $n$; $o$, the upright bearing of lever $n$; $n'$, strap or elastic pieces for connecting the lever $n$ with the adjustable face-plate and the cog-wheel K; $o^2$, the revolving bearing for the end of the shaft of the conical roller, (shown in red lines in Fig. 1;) $o'$, the yielding guide to allow the roller to accommodate itself to the pressure on it while grinding. The pinion on which the revolving bearing turns is shown in red lines. $p$ is the nut on end of a screw passing through a slot in the platform, allowing the same to move back and forth; $p'\ p'$, nuts on the screw passing through stand $q$, ard for regulating the adjustable yielding guide; $q'$, the elastic spring allowing the roller to yield to the pressure in grinding when the friction is too great and for holding the roller up to its place; $r$, elastic bearings in which the adjustable face-plate works by means of a guide on the same and a groove on the bearing. The elasticity of this bearing is for the purpose of keeping the saw or other article up to the stone. The adjustable frame is of two pieces $s\ s'$, fastened together at top by means of a revolving hinge $t$ and by keys $a^2$ at the bottom. $v'\ v'$ are screws for altering the same, so that I can grind the saw to a taper toward the point, and also thinner on the back than on the front edge; $w$, the screw for adjusting the clamp $x$ for holding the article while being ground; Z, the saw.

In Fig. 3, $w$ is the adjustable screw; $x$, the clamp for holding the saw; $y$, the screw or bolt on which the hinge revolves; $s\ s$, the two pieces of the face-plate; Z, the saw.

In the operation of my invention the face-plate E is attached to the saw-mandrel by means of a screw cut on the end of the same and a worm in the face-plate, or by any equivalent means. The saw is then placed on the mandrel and firmly secured in its place by a small collar $c$ and a screw $d$, or their equivalents. Motion is given to the stone by means of a belt on the pulley C on the end of the shaft on which the stone is hung. The stone is mounted on a frame $a'$, which has a pivot on its lower end let into the sliding carriage, through which it passes. This frame is intended to revolve on this pivot for the purpose of grinding on a portion of the stone instead of the flat surface, thus avoiding the difficulty of too large a surface of the stone being brought to bear on the saw, and enables me to grind faster than I could do if a full breadth of the stone were to cut at once. The stone is made to revolve on this pivot by means of the screws $b\ b$. These screws can be so arranged as to make the stone cut its full width or a portion of it only, at option. By turning the screws equally the stone will stand at a right angle with the face-plate, and consequently cut the whole breadth of its cutting-surface on the saw; but by reversing one of the screws and screwing up the other a portion of the stone will only be presented to the saw. I may use other equivalent means for revolving the stone. The stone is made to traverse longitudinally on the ways by means of the screw O, which has its nut in arm P, and to which the sliding carriage is attached by means of rods J J. This arm also has a rod $i$, passing through it, with rings and thumb-screws attached for regulating the shifting of the belts, which regulates the traverse of the stone. This arm slides on the rod $h$, parallel to the conical pulley, for the purpose of keeping the belt close to the pulley and to move it on the pulley, gradually increasing or decreasing the amount of speed in the traverse motion. As the arm follows the conical pulley it is necessary that the arm can accommodate its length to the variations of traverse. For this purpose the arm has a round tenon, which is let into a mortise fitting snugly, allowing it to contract or expand as the arm traverses the rod.

The driving-belt is made to run on the conical pulley N, passing through the belt-holder on the end of the arm P, and as the arm slides toward the base of the cone the belt is carried with it, thus gradually decreasing the motion of the pulley N', which decreases the motion of the screw O, which is driven by belt on pulley N', and as the driving-belt is carried reversely on the conical pulley the motion of traverse is increased.

Two belts are on the belt-pulley N', one a straight and the other a cross belt. These belts pass around the pulleys $k\ k$ on the end of the screw O and give a reverse motion to each other, and are changed by means of a shifting rod with the belt-holders 1 and 2. As the driving-belt on the conical shaft commences at the small end of the same, the screw is made to revolve reversely to the conical pulley, which causes the arm to slide up toward the large end of the same, carrying the driving-belt with it, causing the stone to traverse in the same direction. As soon as it has traversed far enough for the lever J to fall outward, the straight belt is changed to the loose pulley and the cross-belt is let on the inner pulley $k$, which gives to the screw a reverse motion and causes the stone to traverse to the left or to the center of the saw, thus causing the traverse motion of the stone from fast to slow and from slow to fast, also from right to left, and vice versa.

I do not confine myself entirely to the precise manner described for effecting the traverse motion of the stone, as other equivalents may be substituted.

When I wish to change the bearing of the face-plate to the stone for grinding a saw to a taper, I do so by removing the gear-wheel $j$ and detaching the pin $c'$, which holds the mandrel in its place, and then sliding the yielding guide M forward by means of the screw M' on the end of same. This guide has a screw passing through a slot in the platform, letter $p$, Fig. 2, for the purpose of allowing it to move forward; or I may use other equivalent devices for the same purpose; or I may find it convenient to dispense with the face-plate and use in place of it the conical revolving pressure-roller, as shown in red lines in Fig. 1.

When I wish to grind long or short saws, I remove the face-plate or conical roller and attach to the platform the upright $o$ and lever $n$, to which I attach my adjustable face-plate, which is constructed of two pieces and fastened together with a hinge and revolves on a bolt. Adjustable screws are on the rear side for the purpose of changing the relative distances of the material to be ground to the stone, so that I am able to grind a saw thinner on one edge than on the other; or I can grind my saw thicker at one end than at the other; or by which means I can grind longer saws from the center to the end, leaving the same thicker at the middle than at each end; or I may use a solid pattern instead of the adjustable face-plate increased in thickness where I wish to grind the saw or other article away. This face-plate is attached to the lever $n$ by strap 3 on the front end of the lever, and on the rear end by strap 4 to the connecting-rod $m$, which is attached to crank $m'$ on wheel K, and by which means it is made to reciprocate. The adjustable face-plate has a guide in the rear, passing through a groove in the yielding bearing $r$, thus sustaining it in its proper position and at the same time allowing it to yield, if necessary, from too great pressure in grinding. The adjustable frame, platform, and saw-mandrel are placed on ways made to traverse by means of a screw L, for the purpose of keeping the stone up to its work as it wears away, and increasing the pressure of the stone on the grinding-surface at pleasure. Motion is given to the face-plate and the revolving face-plate by power applied to the pulley $n'$ on the end of the saw-mandrel.

Having thus fully described my invention, what I claim as new, and wish to secure by Letters Patent, is—

1. The manner herein described, or its equivalent, for decreasing the transverse motion of the stone when I wish to grind the most, as at the outer edge of the saw, and increasing the same when I wish to grind less, as at the center of the saw, as set forth.

2. The manner herein described, or its equivalent, for the adjustment of the stone for the purpose of using a portion of the grinding-surface of the same at pleasure, or all the grinding-surface, if desired, as herein set forth.

3. Grinding saws to a taper, as herein described, by means of the adjustable face-plates, in combination with the pivot-boxes $o^2$ and sliding and yielding guides M and $o'$, as set forth.

EMANUEL ANDREWS.

Witnesses:
C. W. ALEXANDER,
T. G. CLAYTON.